United States Patent [19]

Higgins

[11] Patent Number: 5,222,326
[45] Date of Patent: Jun. 29, 1993

[54] METHOD AND APPARATUS FOR GROWING NURSERY STOCK IN SUBTERRANEAN CONTAINERS

[76] Inventor: Harley F. Higgins, P.O. Box 156, Sherwood, Oreg. 97140

[21] Appl. No.: 733,215

[22] Filed: Jul. 19, 1991

[51] Int. Cl.[5] ............................................. A01G 23/02
[52] U.S. Cl. ......................................... 47/73; 47/66; 47/75; 47/78
[58] Field of Search ...................... 47/66, 75, 73, 78, 76

[56] References Cited

U.S. PATENT DOCUMENTS

| | | |
|---|---|---|
| 592,066 | 10/1897 | Simpson . |
| 726,766 | 4/1903 | Schaefer . |
| 2,977,716 | 4/1961 | Pearce ........................ 47/76 |
| 3,184,890 | 5/1965 | McKey . |
| 4,019,279 | 4/1977 | Moorman et al. ........... 47/66 |
| 4,031,832 | 6/1977 | Edwards ...................... 47/66 |
| 4,059,921 | 11/1977 | Moriwaki . |
| 4,142,324 | 3/1979 | Magyar, Jr. ................. 47/78 |
| 4,223,480 | 9/1980 | Welty .......................... 47/73 |
| 4,301,605 | 11/1981 | Newman ...................... 47/76 |
| 4,888,914 | 12/1989 | Reiger . |

FOREIGN PATENT DOCUMENTS 1472192  5/1977  United Kingdom ................. 47/78

*Primary Examiner*—Carl D. Friedman
*Assistant Examiner*—Wynn E. Wood
*Attorney, Agent, or Firm*—Edward B. Watters

[57] ABSTRACT

A method of growing nursery stock in-field, in reusable, permanently buried containers, combining the advantages of both container and in-field planting techniques. Apparatus for practice of the method includes an in-ground container with root-escapement apertures, and a harvesting tool conforming to the shape of the container which coacts with the container to facilitate removal of a plant and its root ball from the container, while leaving the container buried in the ground.

22 Claims, 3 Drawing Sheets

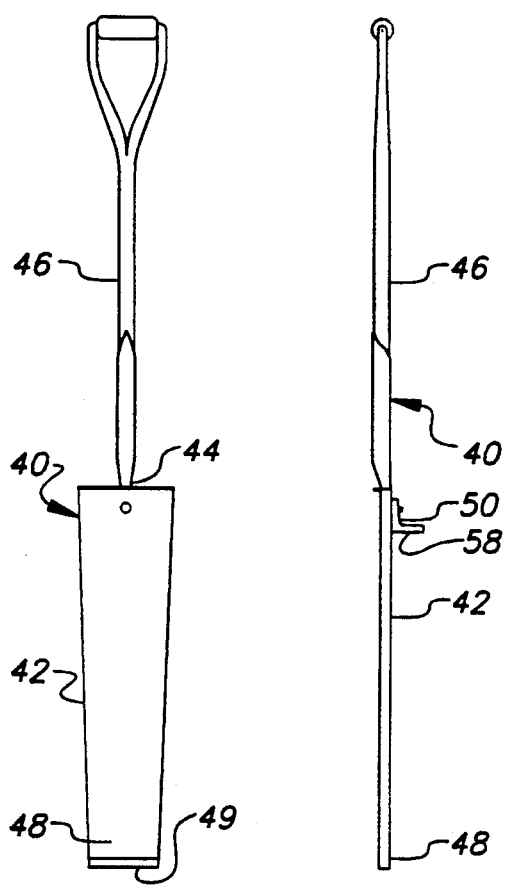
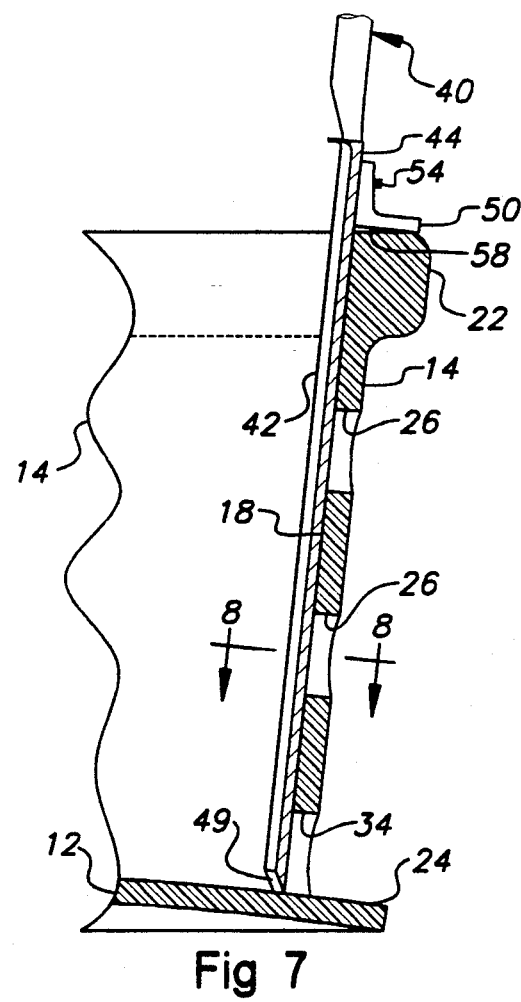
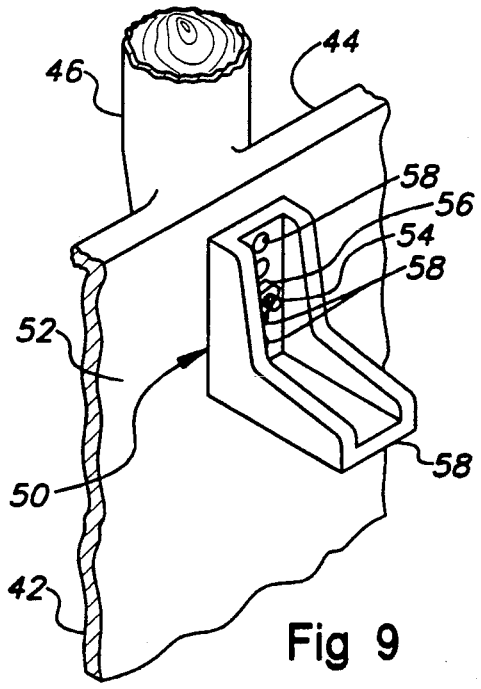
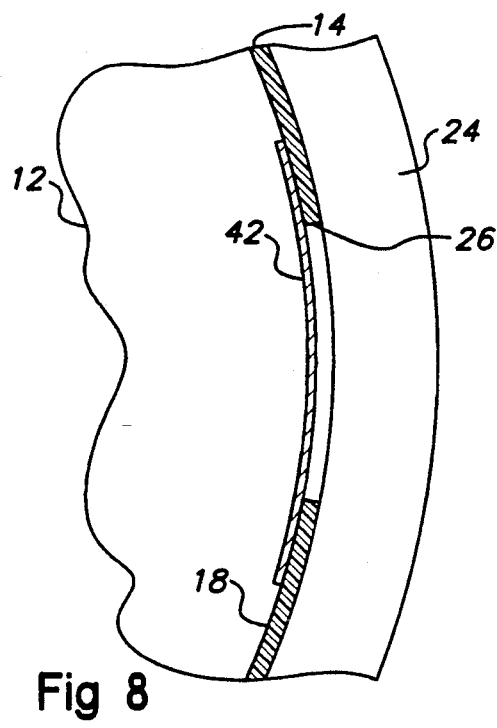
Fig 5  Fig 6  Fig 7  Fig 9  Fig 8

METHOD AND APPARATUS FOR GROWING NURSERY STOCK IN SUBTERRANEAN CONTAINERS

BACKGROUND OF THE INVENTION

This invention relates to plant cultivation, and more particularly, to a method for growing nursery stock in-field, in buried containers, and harvesting the stock from such containers, and including apparatus for practicing the method.

The growing of nursery stock such as trees, shrubs and the like in above-ground containers has been a commercial practice for many years; however, the practice is efficient and economical only during the early period of development of the plant. Nursery stock left too long in the same container not only tends to become root bound, but protracted confinement of plants in above-ground containers leads to a number of problems associated with environmental extremes, viz.: low temperatures during the winter months can damage or kill the roots of trees in above-ground containers, and the trees and containers are readily blown over by high winds, while in the summer months, high soil temperatures can retard plant and root growth. And in extremely dry weather the root system of a plant in an above-ground container can desiccate rapidly. When nursery stock si held in above-ground containers beyond the juvenile growth period, expensive materials and labor-intensive procedures are required to protect the plant and to stabilize and control its growth, e.g., by hilling the container with soil or mulch, and by staking taller plants against high winds.

In contrast, the root systems of field-grown plants are less likely to suffer from extreme weather conditions. When nursery stock is grown in the ground, the soil surrounding the plant insulates the roots from temperatures extremes while maintaining the plant in a upright positions, without staking. However, when grown in the ground without confining root growth, the plant must be timely harvested during the juvenile growing period, lest a spreading and more mature root system be damaged upon extraction of the plant from the ground, which often results in the unsatisfactory growth or even death of the nursery stock after transplanting. Root pruning or transplanting become necessary if fibrous roots are to be grown on a maturing, field-grown plant. Further, the harvesting of field-grown nursery stock is usually seasonal and dependent on weather conditions, and is into conducive of selective harvesting of the stock. Nursery stock grown in a field is conventionally harvested all at the same time. Selective harvesting of larger, field-grown stock requires that the planted rows be spaced far apart to allow passage of harvesting machinery such as digging machines and root ballers, which can be massive as the size of the plants, particularly trees, increases.

The term "ball" utilized herein, a term of the art, means the compact mass of earth or other growing medium and roots moved with a transplanted shrub or tree (Webster's New International Dictionary . . . Second Edition Unabridged.) A ball may or may not be spherical or ovoid in shape. In the "ball-and-burlap" method of transplanting, the ball is tightly wound in burlap.

The planting and growing of nursery stock in the ground, inside containers, is a method in which the walls of the container inhibit or constrict the outward growth of roots, while perforation in the container allow some roots to grow and extend into the ground outside the container. In one technique, nursery stock planted in the ground is confined within a porous fabric container prior to transplanting, and in another, in a molded, perforated plant pot having a plurality of releasable staves. Both of these methods, however, upon transplanting the nursery stock, require that the container and the plant be dug as a unit from the ground, the roots growing exteriorly of the container being broken off or removed from the ground with the container. However, removal of nursery stock in their containers from the ground incurs the same disadvantage as plants grown infield, ex container, viz:, removal by hand implement is time consuming and labor-intensive, while the use of cumbrous and expensive digging machines to extract the container and plant from the ground is capital-intensive and requires, for larger plants, the provision of fallow land between the planted rows to accommodate movement of the heavy machinery.

It is, therefor, a principal object of my invention to provide an improved method and apparatus for growing nursery stock.

A more particular object of the present invention is to provide an improved method of growing nursery stock int he ground in containers, which method combines the advantages of both container and in-field planting methods, and to provide apparatus for practice of the method.

It is another object of the present invention to provide an improved method and apparatus for growing nursery stock in-field, which obviates the loss of topsoil from the field upon harvesting the plants.

Another object of the invention is to provide an improved method, and apparatus for its practice, for growing nursery stock in-field in perennial production while maintaining closely spaced rows for most efficient use of valuable nursery acreage.

Another object of the invention is to provide an improved method and apparatus for its practice which provides partial root containment for optimum growth potential and year-round harvesting, and partial root escapement into surrounding soil for more natural root development, precluding a root-bound plant and enhancing plant stability.

Yet another object of my invention is to provide improved apparatus for growing and harvesting nursery stock in-field, in containers, and including apparatus for harvesting such nursery stock from the in-ground containers.

Another object of the invention is to provide an improved in-ground container for growing nursery stock, and a harvesting tool which coacts with the container to facilitate removal of the stock from the container while leaving the container buried in the ground.

SUMMARY OF THE INVENTION

These and other objects of my invention are achieved in accordance with one aspect thereof, by providing a container having a set of perforations or through holes int he side walls of the container. The base of the container is imperforate and impervious to root penetration. The container is set into the ground, and filled with a planting medium appropriate for the species or variety of nursery stock to be embedded therein, the perforation providing partial root escapement into the soil surrounding the container, while the side walls of the container provide partial root containment to promote formation of the root ball inside the container. While growing, the nursery stock can be watered, if required, by drip irrigation, thereby conserving water and inhibiting fungus growth.

Upon harvesting a plant from a container in which it is growing, a harvesting tool is inserted along the side wall of the container to sever the roots that emanate from the planting medium and extend through the perforations. The harvesting tool includes a blade conforming in shape substantially with the shape of the side wall of the container, and a stop on the blade which engages the top edge of the container to prevent the blade form penetrating and damaging the base of the container. After severing the escaping roots, the plant together with the ball can be easily lifted from the container, while the container remains in the ground ready for the replanting of additional nursery stock.

The container is preferably molded in one piece of plastic material in an inverted frusto-conical shape. A lowermost one of the perforations located near the bottom of the container promotes proper drainage of excess water therefrom. The base of the container can be slightly convex (bottom or outside of the container concave) to further promote drainage. It is desirable to provide an exteriorly projecting element on the container to resist the container being urged from out of the ground when a plant contained therein is harvested.

The coaction of the harvesting tool and the container thus confers on my method the advantages of both container and field grown operations, while discarding the disadvantages of both. Upon removal from the container, the ball can be tightly wrapped in burlap as in the ball-and-burlap method of transplanting, or otherwise contained for shipping. The ball being of uniform size, having a substantially flat bottom, and consisting usually of a lighter weight planting mixture than is conventionally used in the ball-and-burlap method, effectuates reduced handling and shipping costs.

In another embodiment of my invention, the planting step includes emplacement of a harvesting sling in the container prior to adding the planting medium, the sling being comprised of one or more strips of webbing laid across the bottom of the container, and up along the side walls between the vertically arranged holes, such that the ends of the sling protrude from the planting medium at the top peripheral edge on opposite sides of the container. Upon transplanting, pulling on the sling facilitates removal of the plant and ball from the container.

BRIEF DESCRIPTION OF THE DRAWINGS

While the invention is set froth with particularity in the appended claims, other objects, features, the organization and method of practicing the invention will become more apparent, and the invention will best be understood by referring to the following detailed description in conjunction with the accompanying drawing in which:

FIG. 5 is a front elevational view of a harvesting tool according to the instant invention;

FIG. 6 is a side elevational view of the harvesting tool of FIG. 5;

FIG. 7 is a section view illustrating the coaction between the container and harvesting tool in practicing the method according to the instant invention;

FIG. 8 is a section view taken generally along lines 8—8 of FIG. 7;

FIG. 9 is a cutaway perspective view of the proximal end of the blade of the harvesting tool showing the stop;

DESCRIPTION OF THE PREFERRED EMBODIMENT

Figure 1:
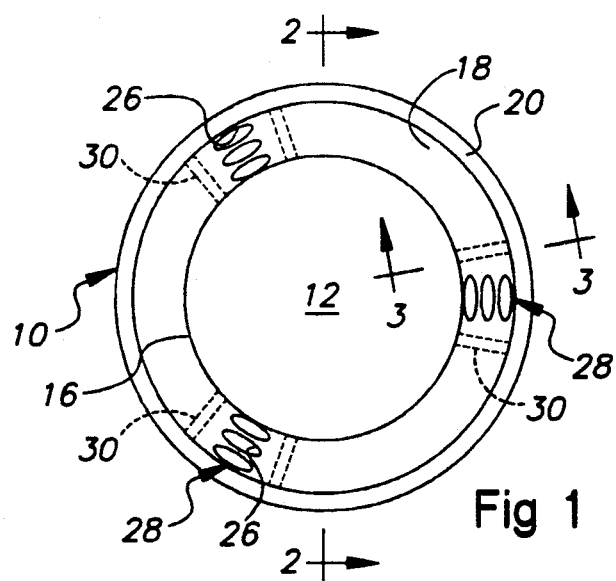
FIG. 1 is a top plan view of a container according to the invention.
Figure 2:
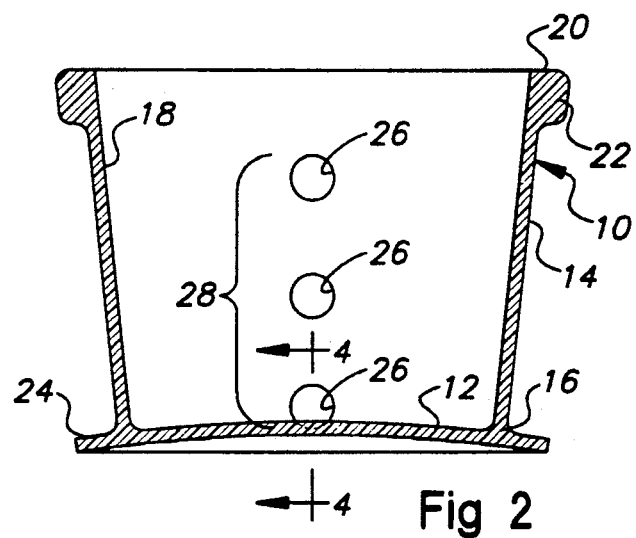
FIG. 2 is a section view of the container taken along lines 2—2 of FIG. 1.
Figure 4:
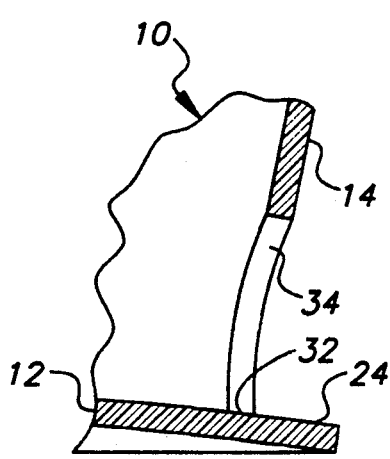
FIG. 4 is a section view of the container taken along liens 4—4 of FIG. 2.
Figure 3:
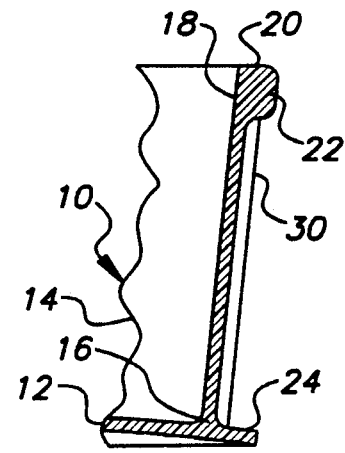
FIG. 3 is a section view of the container taken along lines 3—3 of FIG. 1.

Referring now to the various views of the drawing for a more detailed description of the method of practice, the components, materials, construction, function, operation and other features of my invention by characters of reference, FIGS. 1-4 illustrate a molded one-piece container 10 open at the top and having a circular base 12, slightly convex interiorly, from which a side wall 14 extends upwardly from a locus 16 concentric with the periphery of the base 12. The inside face 18 of the side wall 14 is vertically linear to a top edge 20, which extends radially outward to form a thickened reinforced rim 22. The base 12 of the container extends radially outward from the locus 16 at its intersection with the side wall 14 to form an annular flange 24 exteriorly of the side wall 14. Although in its preferred embodiment the container is of inverted frusto-conical shape, it can be otherwise shaped, e.g. cylindrical, or square or rectangular in cross section.

The base 12 of the container 10 is imperforate, while the side wall 14 has a plurality of holes 26 or perforating apertures defined therein, the perforations 26 being arranged in vertically oriented columns 28 regularly spaced around the side wall 14. The perforating holes 26 are suitably round as shown but can be of any shape. Stiffening ribs 30 are provided in the side wall 14 near the hole columns 28. The bottom peripheral edge 32 of the lowermost hole 34 (see FIG. 4) in each column intersects the base 12 tangentially, providing a means for water to drain from the container, the convexity of the base further promoting good drainage.

The container 10 int he presently described embodiment of the invention is utilized for growing nursery stock comprising medium and larger size shade and flowering trees and conifers. The container is suitably molded in a single piece, of durable thermoplastic material such polyurethane or polyvinyl chloride (PVC); the material can include a filler such as glass for additional strength. The base 12 of the container suitably has an inside diameter of fifty-five centimeters, the side all 14 is fifty-five centimeters in height, and the opening at the top 20 of the side wall 14 sixty-five centimeters across. The thickness of the base 12 and side wall 14 is four millimeters, while the thickness of the reinforced rim 22 is about 1.5 centimeters; the annular flange 24 is six centimeters wide. The diameter of the side-wall holes 26 is approximately six centimeters, or about 1/9 the weight of the side wall 14. While I have found that three columns of holes with three holes in each column provide satisfactory root escapement for general use as described, additional or fewer columns of holes can be provided of other nurser stock. The minimum diameter hole 26 in the size of container described is about five centimeters in order to facilitate escapement for roots which can approach that size. A seedling having two years growth upon planting in a suitable planting medium int eh container can reach a main-trunk size of 4.5 to 6.5 centimeters caliper (30 centimeters above the ground at harvest, after three to four years growth in the container, depending on the variety of plant. Harvesting can be sooner if desired.

Referring now to FIGS. 5–9, the method according to my invention is practiced with a harvesting tool 40, which coacts with the container 10 above described. An elongate blade 42 of the harvesting tool 40 is attached at its proximal end 44 to a handle 46. The blade 42 is arcuate in cross section, as best seen in FIG. 8, conforming with the shape of the inside face 18 of the container. The distal end 48 of the blade 42 is provided with a sharpened edge 49 to facilitate cutting roots that extend from the planting medium inside the container through the root-escapement apertures and into soil surrounding the buried container, when the harvesting tool is inserted against the inside face 18 of the container, as best seen in FIG. 7, between the face 18 and the planting medium (omitted from FIG. 7 for clarity). The cutting edge 49 is beveled on the inside of the blade to urge the blade toward the inside face 18 of the container as the blade descends through the planting medium.

A stop 50, suitably made of steel channel, is attached to the outer side 52 of the blade near its proximal end 44 by a suitable fastener such as a bolt 54 and nut 56. The top 50, wherein engages and abuts the top edge 20 of the container 10, limits the depth of penetration of the blade 42 into the container. Several holes 58 are provided in the stop 50 to facilitate changing the vertical position of the stop on the blade 42. The stop 50 is positioned on the out side 52 of the blade 42 such that the distance between the bearing surface 58 of the stop 50 and the cutting edge of the blade is equal to the slant height of the inside face 18 of the container. When so positioned, the cutting edge 49 of the blade 42 can cut roots extending through the lowermost root-escapement aperture 34 without penetrating or damaging the base 12 of the container. I have found that locating the lowermost hole at the base slightly above the surface of the base, about five millimeters, facilitates cutting off cleanly the roots extending through the lowermost root-escapement aperture.

The blade 42 of the harvesting tool, although described and shown herein in a preferred embodiment attached to a handle 46, can be attached at its proximal end 44 to a powered device such as one operated hydraulically from a power tack-off of a tractor, to plunge the blade into the container. A power operated blade can be made considerably wider, extending part way around the container to subtend more than one column 28 of root-escapement apertures.

Figure 10:
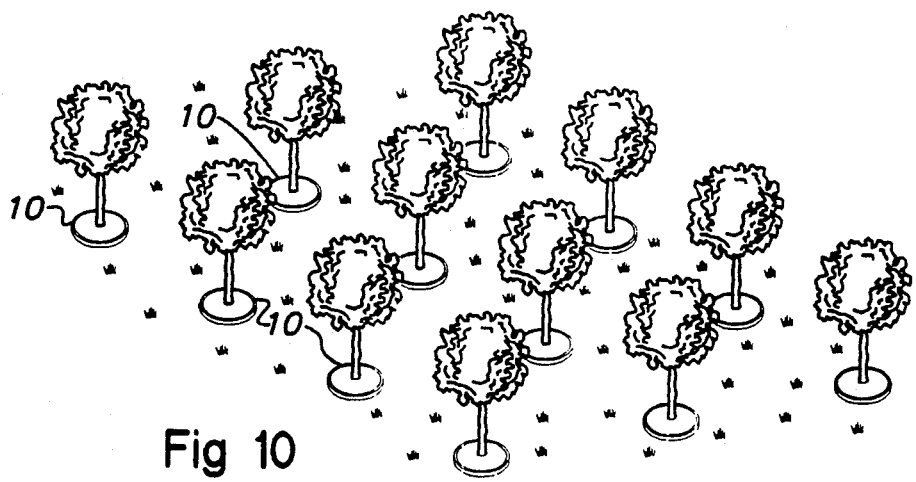
FIG. 10 illustrates the method of planting nursery stock in buried containers in accordance with my invention.

The method according to my invention is practiced by burying a plurality of containers 10 as described, in a field closely spaced apart in a matrix as illustrated in FIG. 10, the distance between the containers in the presently described embodiment of the invention being about two meters at minimum to allow sufficient soil between the containers for effective root nourishment.

The containers are filled with a planting medium, suitably a mixture f soil, sand and moisture retaining agent such as peat and/or vermiculite, and nursery-stock embedded in the planting mixture.

Figure 11:
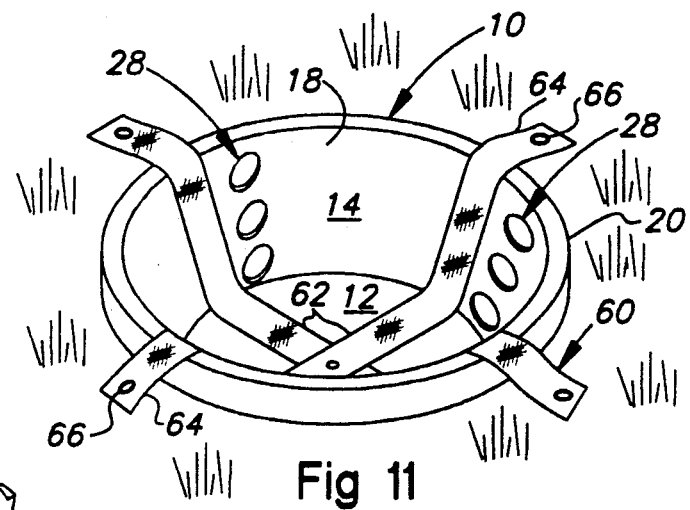
FIG. 11 illustrates a harvesting sling used in the practice of the present invention.

Referring to FIG. 11, prior to filling the containers with the planting medium, a harvesting sling 60 comprising one or more strips of webbing 62 can be laid across the base 12 of the container and up the inside face 18 of the side wall 14 between the columns of apertures 28 so as not to interfere with escapement of the growing roots or with the blade of the harvesting tool upon transplanting. The sling 60 is made of a strong, synthetic fabric relatively impervious to deterioration when buried, suitably polyacrylonitrile or polypropylene. The webbing 62, having ends 64 which protrude form the container 10 and extend radially outward from the edge 20 thereof, is provided with grommets 66 to facilitate gathering the ends into a sling around the ball of the plant.

While growing in the containers 10, the nursery stock can be watered, if required, by drip irrigation, thereby conserving water and inhibiting fungus growth. During the growth period, the container provides partial root containment for optimum growth potential and year-round harvesting, and partial root escapement into surround soil for more natural root development, precluding a root-bound plant and enhancing plant stability. After a suitable period of growth in which the plant forms a heterogeneous ball 70 (see FIG. 12) of roots and planting medium in the container, the plant can be harvested. Although the growing time to harvest can be as short as six months, the time can vary from one to three years or more depending on the variety of plant and the market demand. Individual plants in the matrix of containers (FIG. 10) can be harvested on demand, and the containers readily replanted.

Figure 12:
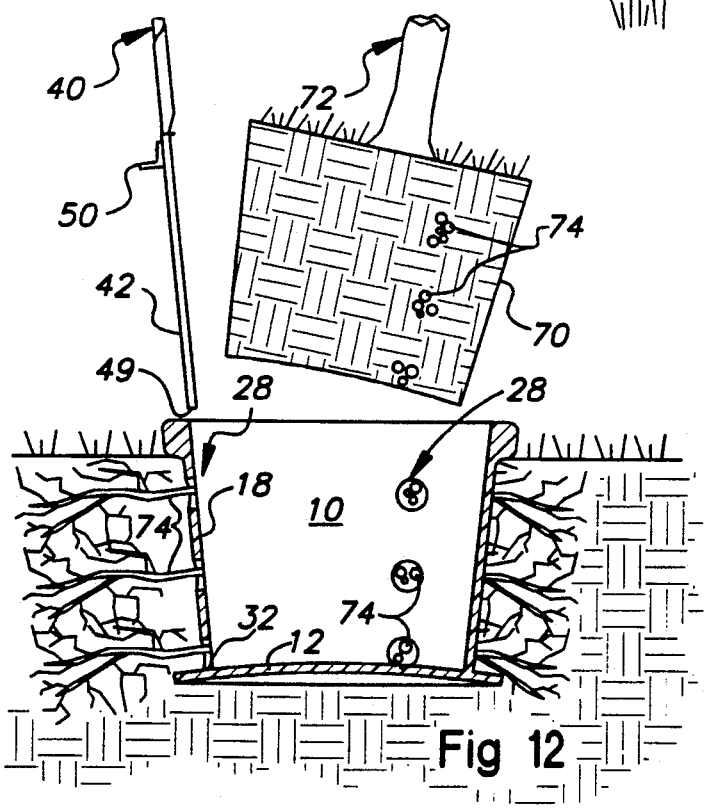
FIG. 12, partially in section, illustrates schematically the manner of harvesting a plant form a container in accordance with the instant invention.

Referring now to FIG. 12, when a plant such as plant 72 is selected for harvesting, the blade 42 of the harvesting tool 40 is inserted into the container 10 closely fit between the inside face 18 of the container and the ball 70 (for clarity, shown removed from the container in FIG. 12), at a location of a column 238 of root-escapement apertures (see also FIGS. 7, 8 and 10). The blade is thrust slidably downward into the container to sever the escaping roots at each of the columns of apertures, thus freeing the ball 70 from the container, the stop 50 on the out side of the blade arresting the downward motion of the blade 42 at the point 32 wherein the cutting edge 49 reaches the intersection of the side wall with the base of the container, to thereby prevent the blade form damaging the base 12 of the container. The ball 70 is thus freed from the container 10 by the action of cutting the escaping roots 74; the base 12 of the container 10, being imperforate, smooth and impervious to root penetration, cannot grip or hold the ball 70 to the bottom of the container. After the ball 70 is loosened from the container 10, the plant 72 and ball 70 can readily be removed intact from the container, in the case of a sampler plant simply by grasping the main stem or trunk of the plant and lifting it free. Larger, heavier plants can be lifted by means of the harvesting sling, previously described with reference to FIG. 9, by gathering the ends of the sling and hoisting the plant 72 and ball 70 from the container.

While the principles of the invention have now been made clear in the foregoing illustrative embodiment, there will be immediately obvious to those skilled int eh art many modifications of structure, arrangement, proportions, the elements, material and components used int he practice of the invention, and otherwise, which are particularly adapted for specific environments and operating requirements without departing form those principles. The appended claims are, therefore, intended to cover and embrace any such modifications, within the limits only of the true spirit and scope of the invention.

I claim:

1. In combination, an apparatus for growing and harvesting nursery stock in-field in containers buried in the ground, the apparatus comprising:

a container having a base, and side walls extending upward from the base and defining an open top, the base being imperforate and impervious to root penetration, the side walls including perforate means for partial escapement into the ground from the buried container of roots of a plant embedded and growing in a planting medium filling the container; and tool means conforming to the shape of the side walls of the container and including means for cutting roots of a plant growing in the container at locations in the side walls where the roots extend through the root-escapement means, the tool means being shaped for insertion inside the container along the side walls thereof and includign stop means engageable with the side walls for limiting depth of penetration of the cutting means to prevent damage to the base of the container by the cutting means.

2. The apparatus according to claim 1 wherein the container includes means for retaining the container buried in the ground upon harvesting the plant growing in the container.

3. The apparatus according to claim 1 further comprising webbing means inside the container for lifting the plant and its planting medium form the buried container after the escaping roots have been cut by the tool means.

4. The apparatus according to claim 1 wherein at least one of the perforate means for root escapement is defined in the side wall at the base of the container to promote drainage of water therefrom.

5. The apparatus according to claim 4 wherein the base of the container is slightly convex interiorly to further promote drainage through the one perforate means.

6. A method of growing and harvesting nursery stock in a open container of the type having root-escapement apertures in a side wall of the container, the method comprising the steps of:

(A) burying the container in the ground;

(B) planting a nursery-stock plant in the container including the steps of (B1) filling the container with a suitable planting medium, and (B2) embedding the plant in the planting medium;

(C) harvesting the plant from the buried container after sufficient growing time that the plant has formed a ball inside the container, the harvesting step including the steps of (C1) providing a harvesting tool having a blade conforming with the shape of the side wall of the container;

(C2) inserting the harvesting tool having a blade conforming with the shape of the side wall of the container into the container between the side wall and the planting medium at the location of the apertures;

(C3) pushing the harvesting tool downward to sever the roots of the plant that extend thought he root-escapement apertures into the soil surrounding the buried container, thereby freeing the ball from the container; and (C4) removing the plant and its ball from the container, leaving the container buried in the ground.

7. The method according to claim 6 wherein the step of removing the plant from the container includes the steps of:

grasping the plant by its main stem or trunk; and lifting the plant and its ball from the container.

8. The method according to claim 6 wherein the planting step includes, prior to filling the container with the planting medium, the step of laying a harvesting sling across the base of the container and up the interior side wall of the container on opposite side of the container in noninterfering relation with the root-escapement aperture; and the step of removing the plant from the container includes the steps of grasping the ends of the harvesting sling which protrude from the container, and pulling upward on the harvesting sling to lift plant and its ball from the buried container.

9. The method according to claim 6 wherein the step of burying the container in the ground includes burying a plurality of such containers closely spaced apart in a field.

10. Apparatus for growing nursery stock in-field in buried containers holding a planting medium, the apparatus comprising:

a container having a base impervious to root penetration, and a side wall circumscribing the base and extending upward therefrom to a top edge, the side wall being of uniform height and having an inside face of generally regular contour in horizontal cross section of the side wall, a column of apertures through the side wall, the column of apertures having a substantially vertical locus with respect to the side wall, the apertures providing root escapement through the side wall for a plant embedded in the planting medium and growing in the container, a lowermost one of the apertures having a peripheral edge near the base of the container to promote drainage of excess water from the container; and a harvesting tool adapted for cutting roots of the plant growing int he container at loci where the roots extend through the apertures in the side wall, the tool having an elongate blade having a distal end, a proximal end, an in side and an out side, a cutting edge at the distal end of the blade, the length of the blade being equal at least to the height of the side wall of the container, the blade having a cross-sectional shape conforming to the contour of the side wall such that the blade can be inserted closely fit between the planting medium and the inside face of the side wall and plunged downward into the container at the locus of the apertures, the out side of the blade traversing slidably down the face of the side wall as the cutting edge of the descending blade severs the roots extending through the apertures in the side wall, means attached to the proximal end of the blade for holding the blade, and a stop attached on the out side of the blade at a distance from the cutting edge of the blade equal to the height of the side wall of the container, the stop thereby engaging the top edge of the side wall to arrest downward motion of the blade at a point where the cutting edge reaches the intersection of the side wall with the base of the container to prevent the cutting edge of the blade from damaging the base of the container.

11. The apparatus according to claim 10 comprising a harvesting sling formed of webbing laid inside the container beneath the planting medium, across the base and extending up the inside face of the side wall in non-interfering relation witt the apertures, opposite ends of the webbing protruding from the container on opposite sides thereof such that pulling on the ends of the webbing facilitates lifting and removal of the nursery stock and planting medium from the container.

12. The apparatus according to claim 10 wherein the top edge of the side wall of the container includes a peripheral rim thicker than the side wall.

13. The apparatus according to claim 10 wherein the side wall of the container includes a vertically oriented stiffening rib exteriorly of the container and near the column of apertures.

14. The apparatus according to claim 10 wherein the container is of inverted frusto-conical shape.

15. The apparatus according to claim 14 wherein the top edge of the side wall of the container includes an annular peripheral rim thicker than that side wall.

16. The apparatus according to claim 10 comprising holding means for resisting a tendency of the container to be pulled form the ground during harvesting of a plant grown in the container, thereby holding the container buried in the ground.

17. The apparatus according to claim 16 wherein the holding means comprises a peripheral flange protruding outward from the side wall of the container.

18. The apparatus according to claim 17 wherein the container is a unitary structure of thermoplastic material.

19. The apparatus according to claim 10 wherein the position of the stop on the blade of the harvesting tool is adjustable to change the distance between the stop and the cutting edge of the blade to accommodate containers o different height.

20. The apparatus according to claim 10 wherein the base of the container is slightly convex interiorly to promote drainage through the lowermost aperture.

21. The apparatus according to claim 10 comprising at least tow additional columns of apertures through the side wall, each of the additional columns of apertures having a substantially vertical locus with respect to the side wall, a lowermost one of the apertures of each of the additional columns having a peripheral edge near the base of the container to promote drainage of excess water from the container, the columns of apertures being regularly spaced around the side wall.

22. The apparatus according to claim 10 wherein the container is a unitary structure of thermoplastic material.

* * * * *

UNITED STATES PATENT AND TRADEMARK OFFICE
CERTIFICATE OF CORRECTION

PATENT NO. : 5,222,326
DATED : June 29, 1993
INVENTOR(S) : Harley F. Higgins

It is certified that error appears in the above-indentified patent and that said Letters Patent is hereby corrected as shown below:

Column 1, line 27, change "si" to --is--; line 38, change "in a" to --in an--; line 39, change "positions" to --position--; line 50, change "into" to --not--. Column 2, line 22, change "therefor" to --therefore--; lines 27 and 63, change "int he" to --in the--; line 68, change "perforation" to --perforations--. Column 3, line 14, change "form" to --from--; line 53, change "DRAWINGS" to --DRAWING--. Column 4, line 18, change "form" to --from--; line 53, change "int he" to --in the--; line 61, change "all" to --wall--. Column 5, line 1, change "weight" to --height--; line 10, change "int eh" to --in the--; line 36, change "top" to --stop--, change "wherein" to --which--; line 57, change "tack-off" to --take-off--. Column 6, line 2, change "f" to --of--; line 15, change "form" to --from--; lines 25 and 26, change "surround" to --surrounding--; line 42, change "238" to --28--; line 51, change "form" to --from--; line 59, change "sampler" to --smaller--; line 67, change "int eh" to --in the--. Column 7, line 2, change "int he" to --in the--. Claim 1, line 27, change "includign" to --including--. Claim 3, line 38, change "form" to --from--. Column 8, claim 6, line 4, change "thought" to --through--; line 5, change "he" to --the--. claim 8, line 20, change "side" to --sides--; line 22, change "aperture" to --apertures--. Claim 10, line 51, change "int he" to --in the--

UNITED STATES PATENT AND TRADEMARK OFFICE
CERTIFICATE OF CORRECTION

PATENT NO. : 5,222,326
DATED : June 29, 1993
INVENTOR(S) : Harley F. Higgins

It is certified that error appears in the above-indentified patent and that said Letters Patent is hereby corrected as shown below:

Column 9, claim 11, line 16, change "witt" to --with--. Col. 10, claim 16, line 3, change "form" to --from--. Claim 19, line 16, change "o" to --of--. Claim 21, line 21, change "tow" to --two--.

Signed and Sealed this

Twenty-ninth Day of August, 1995

Attest:

BRUCE LEHMAN

Attesting Officer     Commissioner of Patents and Trademarks